Patented Mar. 3, 1936

2,033,106

UNITED STATES PATENT OFFICE 2,033,106

HEAT INSULATING COMPOSITION AND METHOD OF MAKING

Arthur B. Cummins, Plainfield, N. J., assignor to Johns-Manville Corporation, New York, N. Y., a corporation of New York No Drawing. Application July 27, 1932, Serial No. 625,191. Renewed January 16, 1936

24 Claims. (Cl. 25—156)

The present invention relates to improvements in the manufacture of heat insulation compositions, and, in particular, compositions of this character including as an ingredient diatomaceous silica, otherwice known as diatomaceous earth or kieselguhr.

Diatomaceous earth is a constituent of a number of known types of heat insulation materials. It has, for instance, been employed in combinations with certain amounts of asbestos fibers, and basic magnesium carbonate in the manufacture of heat insulating blocks as set forth in U. S. Patent 1,279,975, to Boeck and Jordan. Products of this character are subject to certain distinct limitations and deficiencies with respect to their strength and insulation capacity at elevated temperatures, such products undergoing undue decomposition and shrinkage at 1500–1600° F.

The primary object of my invention is the provision of a heat insulation material adapted for use at elevated temperatures wherein these deficiencies are largely corrected.

The invention contemplates particularly the improvement in properties of compositions and their method of manufacture of the type disclosed in the above mentioned U. S. Patent No. 1,279,975, to Boeck and Jordan.

In the practice of my invention, the diatomaceous silica is subjected to a calcination treatment, preferably in the presence of a relatively small amount of a suitable flux such as sodium carbonate, prior to its incorporation into the other ingredients of the mix. It has further been ascertained that the benefits of employing the diatomaceous earth in the calcined state are greatly enhanced by employing a certain amount of a distending and binding agent such as bentonite in conjunction therewith. Further features and advantages of the invention will be apparent from the following detailed description thereof.

The mode of practicing the invention is exemplified by the following illustrative mixes. In the manufacture of heat insulation blocks in accordance with these illustrative mixes, the procedure employed may be as follows:

The solids are first mixed with sufficient water to provide a thick slurry which is thereafter molded under pressure in filter molds with expulsion of the water. The amount of water present in the initial mix may be varied, especially satisfactory results being secured by maintaining solids to liquids in the ratio of about one part of solids to 8–12 parts water. The bentonite is first added to warm water and stirred, and the basic magnesium carbonate and fiber added thereto. The basic magnesium carbonate may be added in the form of a thick slurry and is, suitably, similar in its properties to the basic magnesium carbonate employed in the manufacture of the product known in the trade as "85% Magnesia", from dolomite or magnesite. After thorough agitation of this mixture, the calcined diatomaceous silica is added thereto. After mixing, the ingredients are preferably permitted to stand for a suitable period, as, for example, about two and a half hours, to complete the swelling or distending of the bentonite. The resulting slurry is then molded into suitable block form with expulsion of the water by conducting it into filter molds of a conventional design under suitable pressure, e. g., 10–50 pounds per square inch. The blocks thus produced are thereafter dried, and planed to the desired dimensions for use.

The following formulæ are illustrative mixes which resulted in products having particularly desirable properties:

Formula (1)

| | Per cent |
|---|---|
| Calcined diatomaceous earth (wet density of 18.9) | 73 |
| Basic magnesium carbonate | 8 |
| Asbestos fiber | 10 |
| Bentonite | 8 |
| Silicate of soda | 1 |

(2)

| | Per cent |
|---|---|
| Finely divided diatomaceous earth calcined with a flux of sodium carbonate | 67 |
| Basic magnesium carbonate | 8 |
| Asbestos fiber | 10 |
| Bentonite | 15 |

(3)

| | Per cent |
|---|---|
| Finely divided diatomaceous earth calcined with 5% hydrated lime | 68 |
| Basic magnesium carbonate | 8 |
| Asbestos fiber | 10 |
| Bentonite | 14 |

Heat insulation blocks made as above described have been found to exhibit a marked increased resistance to shrinkage at elevated temperatures compared with, for instance, compositions of the type disclosed in the Boeck and Jordan patent. Products made from diatomaceous silica calcined in the presence of a flux such as mix 2, for instance, may be improved, in this respect, to such an extent that their range of satisfactory commercial use is increased about 400° F., and products made with calcined diatomaceous silica calcined under similar conditions, but not employing a flux, show a similar substantial improvement in this respect to a somewhat less extent. The blocks likewise have the advantage of being less dense and accordingly are better for heat insulation purposes. The preliminary calcination of the diatomaceous silica renders it feasible to employ a lower grade of diatomaceous silica, that is, a diatomaceous silica containing a higher proportion of impurities than is ordinarily satisfactory, thereby effecting a substantial economy. The preliminary calcination of the diatomaceous silica further facilitates the molding operation since the slurry may be filtered satisfactorily at a faster rate.

The presence of the bentonite has been found to be highly important in attaining the full benefits resulting from the incorporation of the diatomaceous silica in a calcined condition, particularly in imparting an optimum degree of strength to the block. When making insulating compositions containing calcined diatomaceous earth it has been difficult to secure products having the requisite degree of strength, since the original colloidality or binding properties of the diatomaceous earth were largely destroyed by the calcination. Ordinarily, binding agencies such as plastic clays, etc., may be employed to add strength but these materials tend to increase the density of the composition and correspondingly decrease the insulating value of the same. It has been ascertained that increased strength and low density can be obtained by employing specified amounts of a distending and binding agent such as bentonite. In compositions such as described above, employing calcined diatomaceous earth in major amounts of from 60-85%, it has been found desirable to employ bentonite in amounts of 4%-18%, when the straight calcined diatomaceous silica is employed, and a somewhat greater amount in the range of 6%-22% for the calcined fluxed diatomaceous silica product.

The presence of the bentonite renders the slurry more difficult to filter and would be impractical for compositions utilizing natural or uncalcined diatomaceous earth. The incorporation of the calcined diatomaceous earth, however, permits the use of increased amounts of bentonite as shown in the illustrative formulæ given.

Other colloidal or gel-like binders may be substituted for the bentonite, such as plasticized or cooked starch and highly plastic clays other than bentonite. However, bentonite is regarded as distinctly the best material for this purpose.

A small amount of sodium silicate has been found to enhance the effectiveness of the bentonite. The sodium silicate accelerates and increases the distending or swelling action of the bentonite, and also acts directly as a bond. The sodium silicate should be employed in relatively small amounts, e. g., not in excess of about 1 part to 8 parts of the bentonite, as an excessive amount tends to flocculate the bentonite or otherwise substantially decreases its binding action. Other materials serving to increase the colloidality of or swell the bentonite may be substituted in whole or part for the sodium silicate. Such a material as sodium carbonate has been found to be effective for this purpose.

The conditions under which the diatomaceous earth is calcined prior to its incorporation with the other ingredients of the mix, is of great importance in the attainment of the full advantages of the invention. The earth should be calcined in a finely divided or powdered form, as, for example, of sufficient fineness that 90% of the material will pass a 200 mesh screen. The heating operation in general should be such as to approximate the temperature of incipient fusion of the finely divided material, but should not be such as to destroy its porous, diatomic structure. The average temperature maintained during the heating operation preferably lies within the range of 1600-2300° F. The best results have been secured by employing a fairly high temperature, as, for example, 2000° F.-2100° F. The time of heating is subject to some variation, dependant upon the type of crude diatomaceous earth employed, a period of about one-half hour usually being sufficient. Any suitable form of calcining apparatus may be employed. The conventional form of oil fired rotary kiln has been found especially suitable for this purpose.

The presence of a suitable flux during the calcination treatment is generally desirable, since other conditions being equal, the final product embodying the fluxed calcined material is capable of withstanding a higher temperature without excessive shrinkage. Salts of alkali metals such as sodium carbonate, sodium chloride and the like, represent the most suitable form of fluxes, although lime and other compounds having fluxing properties may be employed. The flux is thoroughly mixed with the diatomaceous material before its introduction into the kiln and is preferably employed in amounts of 2%-8% by weight, of the diatomaceous silica.

Other forms of comminuted inert material characterized by low density which may be otherwise described as inorganic thermo insulating material similar to the magnesium basic carbonate employed in the above illustrative mixes, may be substituted therefor. Expanded vermiculite or "Zonolite", for example, may be employed to replace part or all of the magnesium basic carbonate. In the preferred type of composition, the magnesium basic carbonate is preferably employed in minor amount, the major amount of material consisting of the calcined diatomaceous silica, e. g., 60%-85%, together with a sufficient amount of fibrous material, particularly an incombustible mineral fiber such as asbestos, to impart a desirable degree of strength and body to the product.

What I claim is:

1. A heat insulating block adapted for use at elevated temperatures comprising diatomaceous silica calcined in finely divided condition at a temperature of at least 1600° F., comminuted, inert, material characterized by low density, and fibrous material.

2. A molded heat insulating block adapted for use at elevated temperatures comprising calcined diatomaceous silica, comminuted inert material characterized by low density, and bentonite.

3. A molded heat insulating block adapted for use at elevated temperatures comprising calcined diatomaceous silica, bentonite, basic magnesium carbonate and fibrous material.

4. A molded heat insulating block adapted for use at elevated temperatures comprising calcined diatomaceous silica, bentonite, basic magnesium carbonate and fibrous material, the diatomaceous silica being present in major amount.

5. A molded heat insulating composition adapted for use at elevated temperatures comprising as a major constituent calcined diatomaceous silica in amounts of about 60–85%, bentonite in amounts of about 4–22%, and a light-weight, comminuted, inert, material such as basic magnesium carbonate in minor amounts.

6. A heat insulating block adapted for use at elevated temperatures comprising fluxed calcined diatomaceous silica, comminuted, inert, material characterized by low density, and fibrous material.

7. A molded heat insulating block adapted for use at elevated temperatures, comprising fluxed calcined diatomaceous silica, comminuted inert material characterized by low density, and bentonite.

8. A molded heat insulating block adapted for use at elevated temperatures comprising fluxed calcined diatomaceous silica, bentonite, basic magnesium carbonate and fibrous material.

9. A molded heat insulating block adapted for use at elevated temperatures comprising fluxed calcined diatomaceous silica, bentonite, basic magnesium carbonate and fibrous material, the diatomaceous silica being present in major amount.

10. A molded heat insulating composition adapted for use at elevated temperatures comprising as a major constituent fluxed calcined diatomaceous silica in amounts of about 60–85%, bentonite in amounts of about 4–22%, and a light-weight, comminuted, inert, material such as basic magnesium carbonate in minor amounts.

11. A method of manufacturing a heat insulating composition adapted for use at elevated temperatures comprising forming a slurry of a mixture of diatomaceous silica calcined in finely divided condition at a temperature of at least 1600° F., a comminuted inert material characterized by low density, and water, and forcing the slurry under pressure into a filtering mold, whereby water is removed and a block is formed.

12. A method of manufacturing a heat insulating composition adapted for use at elevated temperatures comprising forming a slurry of a mixture of diatomaceous silica calcined in finely divided condition at a temperature of at least 1600° F., a comminuted inert material and water, said slurry containing about 1 part of solids to 8 to 12 parts of water, and forcing the slurry under pressure into a filtering mold whereby water is removed and a block is formed.

13. A method of manufacturing a heat insulating composition adapted for use at elevated temperatures comprising forming a slurry of a mixture of diatomaceous silica calcined in finely divided condition at a temperature of at least 1600° F., basic magnesium carbonate and water, and forcing the slurry under pressure into a filtering mold, whereby water is removed and a block is formed.

14. A method of manufacturing a heat insulating composition adapted for use at elevated temperatures comprising forming a slurry of a mixture of calcined diatomaceous silica, a comminuted inert material characterized by low density, bentonite and water, and forming molded blocks by expulsion of the water content of the slurry.

15. A method of manufacturing a heat insulating composition adapted for use at elevated temperatures comprising forming a slurry of a mixture of calcined diatomaceous silica, basic magnesium carbonate and bentonite, and forming molded blocks by expulsion of the water content of the slurry.

16. A method of manufacturing a heat insulating composition adapted for use at elevated temperatures comprising forming a slurry of a mixture of calcined diatomaceous silica, a comminuted inert material characterized by low density, bentonite, a peptizing agent for the bentonite, and water, and forming molded blocks by expulsion of the water content of the slurry.

17. A method of manufacturing a heat insulating composition adapted for use at elevated temperatures comprising forming a slurry of a mixture of calcined diatomaceous silica, a comminuted inert material characterized by low density, bentonite, and a relatively small amount of sodium silicate for peptizing the bentonite, and water, and forming molded blocks by expulsion of the water content of the slurry.

18. A molded heat insulating block adapted for use at elevated temperatures comprising calcined diatomaceous silica, comminuted inert material characterized by low density, bentonite, and a peptizing agent for the bentonite.

19. A molded heat insulating block adapted for use at elevated temperatures comprising calcined diatomaceous silica, comminuted inert material characterized by low density, bentonite, and a relatively small amount of sodium silicate for peptizing the bentonite.

20. A molded heat insulating block adapted for use at elevated temperatures comprising calcined diatomaceous silica, bentonite, sodium silicate, basic magnesium carbonate and fibrous material.

21. A molded heat insulating composition adapted for use at elevated temperatures comprising an intimate mixture of diatomaceous silica calcined in finely divided form, at a temperature of approximately 2000 to 2100° F., and a comminuted inorganic, thermal insulating material.

22. A molded heat insulating composition adapted for use at elevated temperatures comprising an intimate mixture of diatomaceous silica calcined in finely divided form at a temperature of approximately 2000° F. to 2100° F., a comminuted, inorganic thermal insulating material, and bentonite in amounts of between 4 and 22 per cent.

23. A molded heat insulating composition adapted for use at elevated temperatures comprising an intimate mixture of diatomaceous silica calcined in finely divided form at a temperature of approximately 2000° F. to 2100° F., basic magnesium carbonate, and bentonite in amounts of between 4 and 22 per cent.

24. A molded heat insulating composition adapted for use at elevated temperatures comprising an intimate mixture of diatomaceous silica calcined in finely divided form at a temperature of 2000° F. to 2100° F., a comminuted inorganic thermo insulating material and bentonite.

ARTHUR B. CUMMINS.